United States Patent [19]
Niedospial

[11] Patent Number: 5,046,681
[45] Date of Patent: Sep. 10, 1991

[54] FILM CASSETTE

[75] Inventor: John J. Niedospial, Rochester, N.Y.

[73] Assignee: Eastman Kodak Company, Rochester, N.Y.

[21] Appl. No.: 490,233

[22] Filed: Mar. 8, 1990

[51] Int. Cl.⁵ .......................... G03B 1/04; G03B 17/26
[52] U.S. Cl. ..................................... 242/71.1; 354/275
[58] Field of Search ........................ 242/71, 71.1, 71.3, 242/71.4, 71.5, 71.6, 71.7, 71.8, 71.9

[56] References Cited

U.S. PATENT DOCUMENTS

| 988,341 | 4/1911 | Hill . | |
|---|---|---|---|
| 1,973,457 | 9/1934 | Wittel | 95/9 |
| 2,182,398 | 12/1939 | Gantnier | 242/71.8 |
| 2,336,278 | 12/1943 | Mihalyi | 95/31 |
| 2,360,255 | 10/1944 | Mihalyi | 242/71 |
| 2,364,381 | 12/1944 | Mihalyi | 342/71 |
| 2,521,932 | 9/1950 | Mihalyi et al. | 242/71 |
| 2,541,476 | 2/1951 | Mihalyi | 242/71 |
| 2,552,200 | 5/1951 | Mihalyi | 242/71 |
| 3,234,024 | 2/1966 | Leinonen | 96/78 |
| 3,659,799 | 5/1972 | Cerutti et al. | 242/71.9 |
| 3,677,499 | 7/1972 | Wangerin | 242/210 |
| 3,797,777 | 3/1974 | Hosono et al. | 242/197 |
| 4,009,842 | 3/1977 | Persha et al. | 242/71.9 |
| 4,145,133 | 3/1979 | Wareham | 242/71.1 X |
| 4,407,579 | 10/1983 | Huff | 354/275 |
| 4,423,943 | 1/1984 | Gold | 354/275 |
| 4,488,796 | 12/1984 | Edwards | 354/275 |
| 4,875,638 | 10/1989 | Harvey | 242/71.1 |
| 4,883,235 | 11/1989 | Niedospial | 242/71.1 |
| 4,887,110 | 12/1989 | Harvey | 354/275 |

FOREIGN PATENT DOCUMENTS 2921379  5/1979  Fed. Rep. of Germany .
926241   9/1947  France .
333201  11/1958  Switzerland ..................... 242/71.8

Primary Examiner—Daniel P. Stodola
Assistant Examiner—John P. Darling
Attorney, Agent, or Firm—Roger A. Fields

[57] ABSTRACT

In a film cassette, a spool core is supported within a cassette shell for rotation in an unwinding direction to automatically thrust a leading end of a filmstrip coiled about the spool core to the exterior of the shell. A pair of flanges are arranged in coaxially spaced relation along the spool core to radially confine the filmstrip. The flanges are sufficiently flexible to permit the filmstrip to flex the flanges farther apart to escape the confinement of the flanges when the spool core is rotated in the unwinding direction. According to the invention, a relatively short longitudinal section of the filmstrip proximate a trailing end of the filmstrip attached to the spool core is sufficiently tapered to permit it to extend between the flanges without having to flex the flanges farther apart. This construction permits the spool core and the flanges to be placed in the cassette shell during assembly of the film cassette, with the flanges in a normal-relaxed rather than flexed condition, and for the filmstrip then to be wound easily about the spool core.

6 Claims, 12 Drawing Sheets

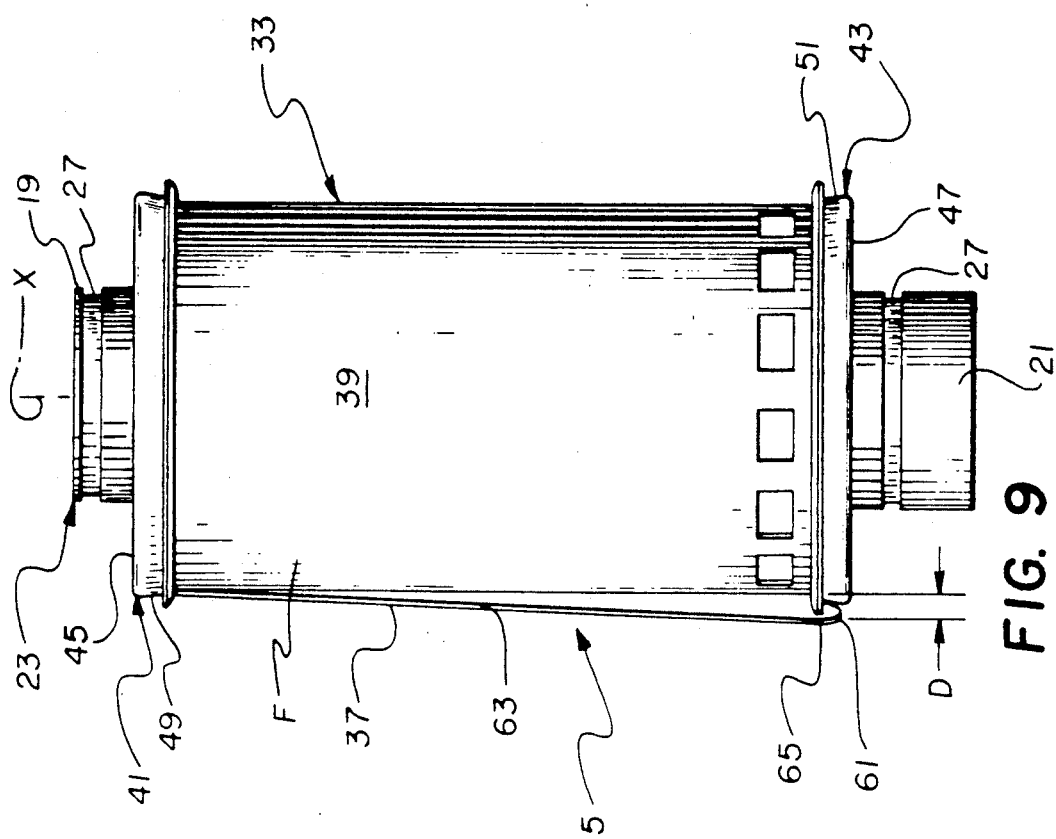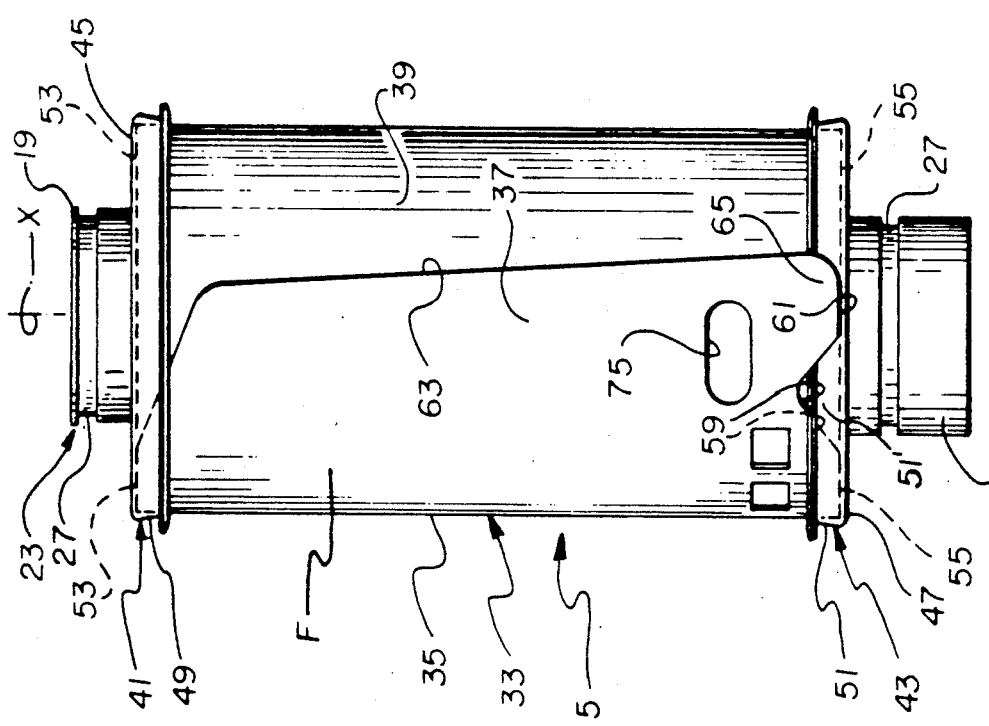

FILM CASSETTE

CROSS-REFERENCE TO RELATED APPLICATIONS

Reference is made to commonly assigned copending applications Ser. No. 07/320,440, entitled FILM CASSETTE, and filed Mar. 8, 1989 in the name of John J. Niedospial; Ser. No. 07/415,750, entitled FILM CASSETTE, and filed Sept. 27, 1989 in the name of John J. Niedospial; Ser. No. 07/464,264 entitled FILM CASSETTE, and filed Jan. 12, 1990 in the names of Edward H. Dowling et al; and Ser. No. 07/490,232, entitled FILM CASSETTE, and filed Mar. 8, 1990 in the name of John J. Niedospial.

BACKGROUND OF THE INVENTION

1. Field of the Invention

The invention relates generally to the field of photography, and particularly to a film cassette containing roll film. More specifically, the invention relates to a film cassette that is capable of automatically advancing a non-protruding film leader to the exterior of the cassette shell responsive to unwinding rotation of a film spool within the shell.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading or forward-most section of the filmstrip approximately 2⅜ inches long, commonly referred to as a "film leader", normally protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip from the shell, and it is necessary in the typical 35 mm camera to engage the protruding leader section to draw the filmstrip out of the shell.

A 35 mm film cassette has been proposed which, unlike conventional film cassettes, can be operated to automatically advance a film leader to the exterior of the cassette shell by rotating the film spool in the unwinding direction. The film leader originally is located entirely inside the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the forward or leading end of the filmstrip is slightly tapered purportedly to allow it to freely extend from between the circumferential lips and rest against the shell wall at a location inwardly of a non-lighttight film passageway to the outside of the cassette shell. During initial unwinding rotation of the film spool, the leading end of the filmstrip is advanced along the shell wall until it reaches an inner entrance to the film passageway. Then, it is advanced into and through the film passageway to the exterior of the cassette shell. The passageway has a width that is less than the width of the filmstrip, thus resulting in the filmstrip being transversely bowed as it is uncoiled from the film spool, and thereby facilitating movement of the film edges under the circumferential lips of the flanges. However, severe transverse bowing of the filmstrip in order to move its longitudinal edges under the circumferential lips of the flanges may damage the filmstrip.

Like the type of film cassette disclosed in U.S. Pat. No. 4,423,923, commonly assigned U.S. Pat. No. 4,834,306 granted May 30, 1989, U.S. Pat. No. 4,848,693, granted Jul. 18, 1989, and U.S. Pat. No. 4,860,037 granted Aug. 22, 1989, each disclose a film cassette that is capable of automatically advancing a non-protruding film leader to the exterior of the cassette shell in response to rotation of the film spool in the unwinding direction. Specifically, there is disclosed a film cassette wherein a film roll is wound on a spool between a pair of coaxially spaced, independently rotatable flanges. The two flanges have respective circumferential annular lips which prevent the outermost convolution of the film roll, including its leading end, from clock-springing into contact with the interior wall of the cassette shell. When the spool is initially rotated in the unwinding direction, the flanges may momentarily remain stationary and the film roll, since its inner end is secured to the spool, tends to expand radially to ensure a firm non-slipping relation between the outermost convolution and the annular lips. Once the non-slipping relation exists, continued rotation of the spool will similarly rotate the flanges. This allows stationary internal spreaders to deflect successive portions of the annular lips to an axial dimension exceeding the film width, in turn allowing the leading end and successive sections of the film roll to be freed from the radial confinement of the annular lips and to be advanced into and through a lighttight film passageway to the exterior of the cassette shell. A stripper-guide located adjacent an inner entrance to the film passageway diverts the leading end of the film roll into the passageway by being received between the leading end and the next-inward convolution of the film roll responsive to unwinding rotation of the spool.

THE CROSS-REFERENCED APPLICATIONS

Cross-referenced applications Ser. No. 07/320,440, No. 07/415,750, No. 07/464,264, and No. 07/490,232 each disclose a film cassette wherein a film roll whose outermost convolution is a film leader is coiled about a spool rotatable within the cassette shell, a pair of flexible independently rotatable flanges are coaxially arranged on the spool to radially confine the film leader within respective skirted peripheries of the flanges to prevent the leader from substantially contacting an interior wall of the cassette shell, and a film stripper-guide projecting from the interior wall is received between a leading end of the film leader and the next-inward convolution of the film roll to free the leader from the flanges and guide the leader through a lighttight film passageway to the exterior of the cassette shell responsive to rotation of the spool in a film unwinding direction. Specifically, the stripper-guide frees the film leader from the flexible flanges by inducing the leader to flex the flanges away from one another at their skirted peripheries during unwinding rotation of the spool. Moreover, the film leader and at least one of the flanges include mutual engagement means for maintaining the leading end of the leader spaced at least a minimum radial distance from the next-inward convolution of the film roll sufficient to locate the leading end within range of the stripper-guide, to ensure that the leading end will be advanced over the stripper-guide responsive to rotation of the spool in the film unwinding direction.

SUMMARY OF THE INVENTION

In a film cassette, a spool core is supported within a cassette shell for rotation in an unwinding direction to automatically thrust a leading end of a filmstrip coiled about the spool core to the exterior of the shell. A pair of flanges are arranged in coaxially spaced relation along the spool core to radially confine the filmstrip. The flanges are sufficiently flexible to permit the filmstrip to flex the flanges farther apart to escape the confinement of the flanges when the spool core is rotated in the unwinding direction. According to the invention, a relatively short longitudinal section of the filmstrip proximate a trailing end of the filmstrip attached to the spool core is sufficiently tapered to permit it to extend between the flanges without having to flex the flange farther apart. This construction permits the spool core and the flanges to be placed in the cassette shell during assembly of the film cassette, with the flanges in a normal-relaxed rather than flexed condition, and for the filmstrip then to be wound easily about the spool core.

BRIEF DESCRIPTION OF THE DRAWINGS

FIGS. 8 and 9 are elevation views of the film roll and the film spool, illustrating the manner in which the film roll is originally stored on the film spool;

FIGS. 13, 14, and 15 are elevation views of the film spool, illustrating the manner in which the film roll is wound onto the film spool during assembly of the film cassette.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
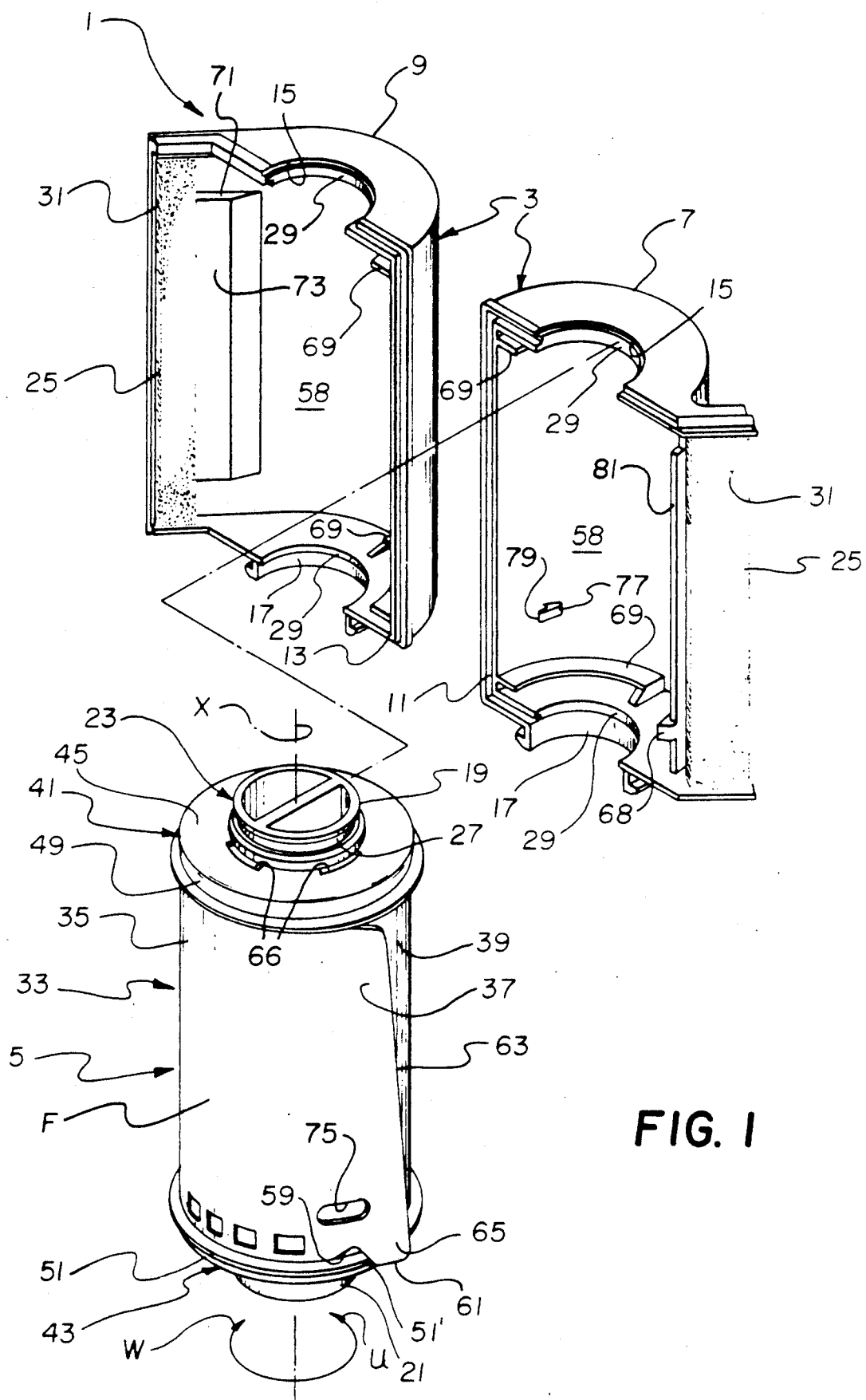
FIG. 1 is an exploded perspective view of a film cassette according to a preferred embodiment of the invention.
Figure 2:
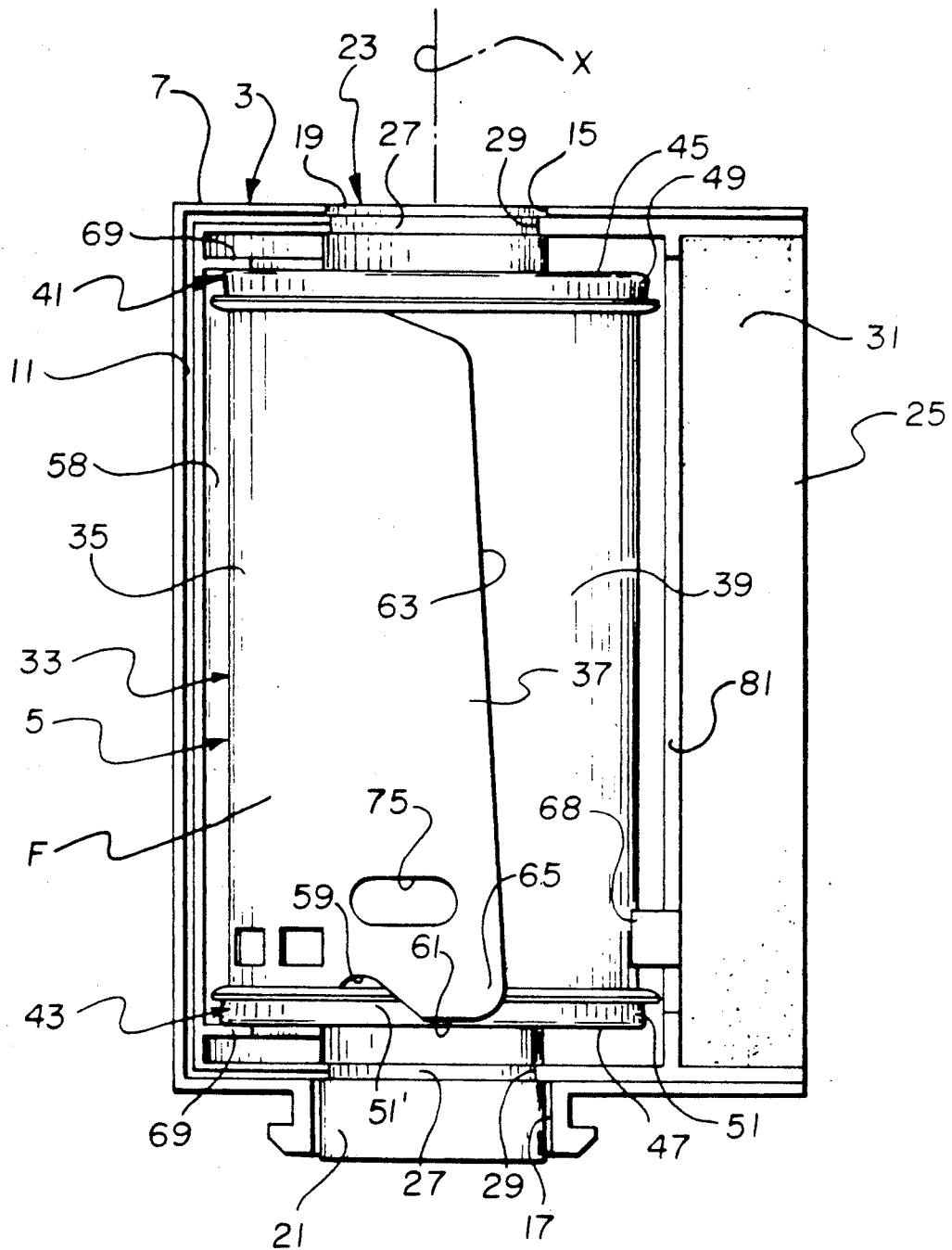
FIG. 2 is an elevation view of the film cassette, illustrating the cassette shell open to reveal a film roll coiled about a film spool.
Figure 12:
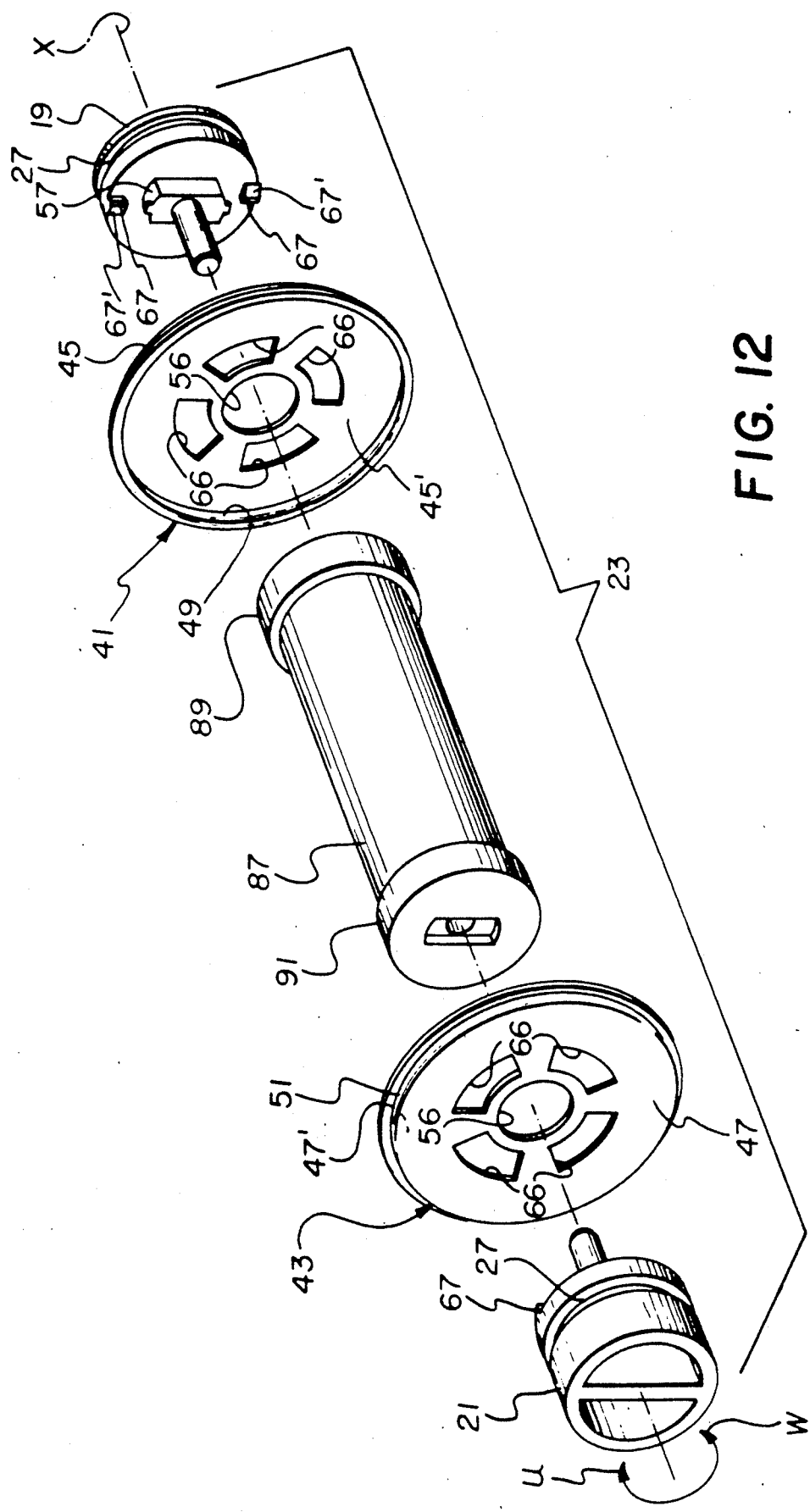
FIG. 12 is an exploded perspective view of the film spool without the film roll.

Referring now to the drawings, FIGS. 1, 2 and 12 depict an improved 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define a narrow relatively-straight film passageway 25 to the exterior of the cassette shell 3. The longer and shorter open-end pieces 19 and 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
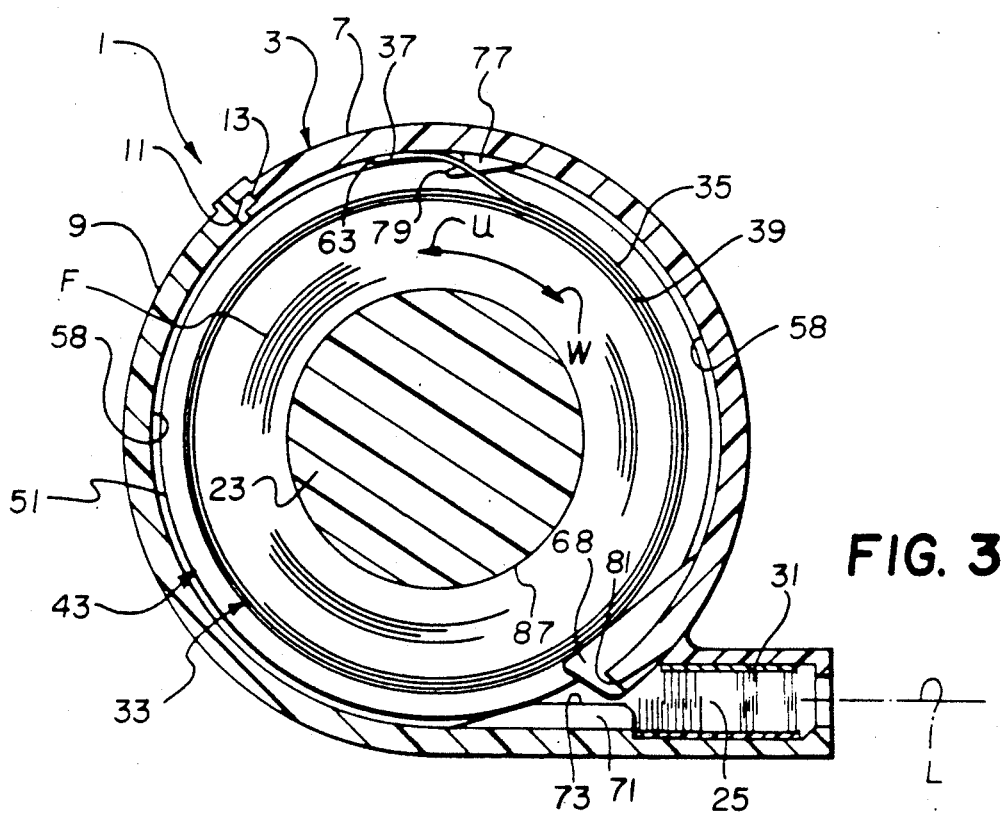
FIG. 3 is an end view partly in section of the cassette shell, the film roll and the film spool, illustrating the manner in which the film roll is originally stored on the film spool.
Figure 5:
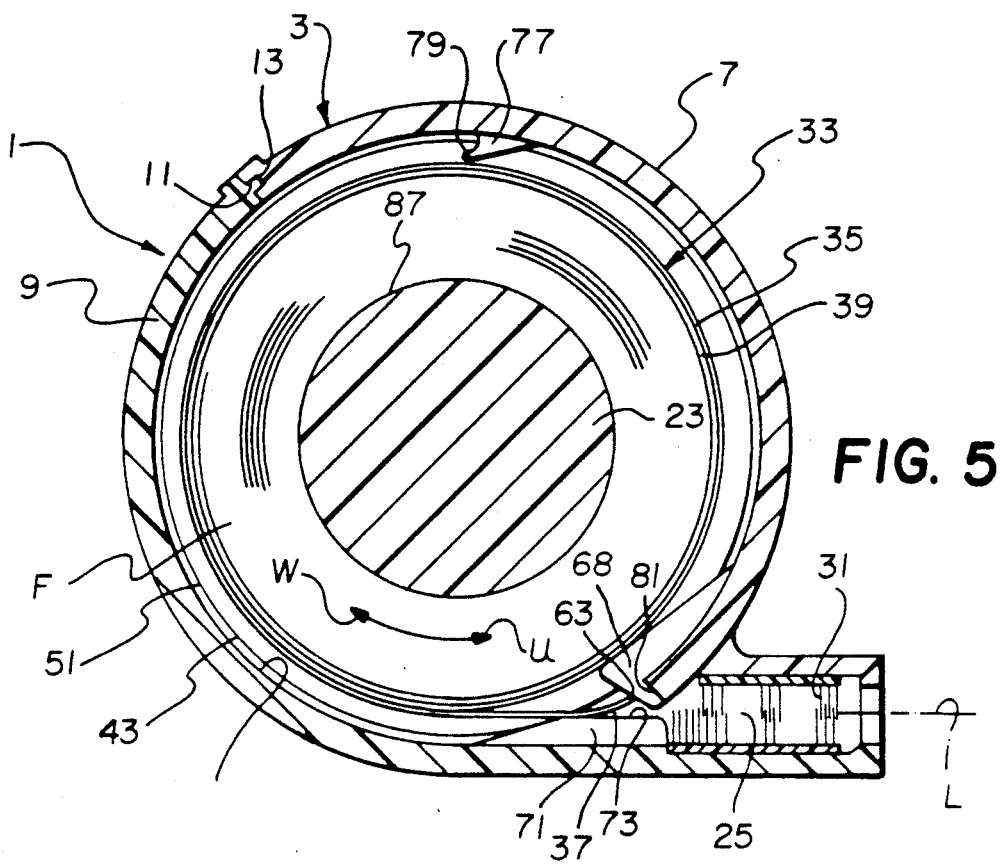
Figure 13:
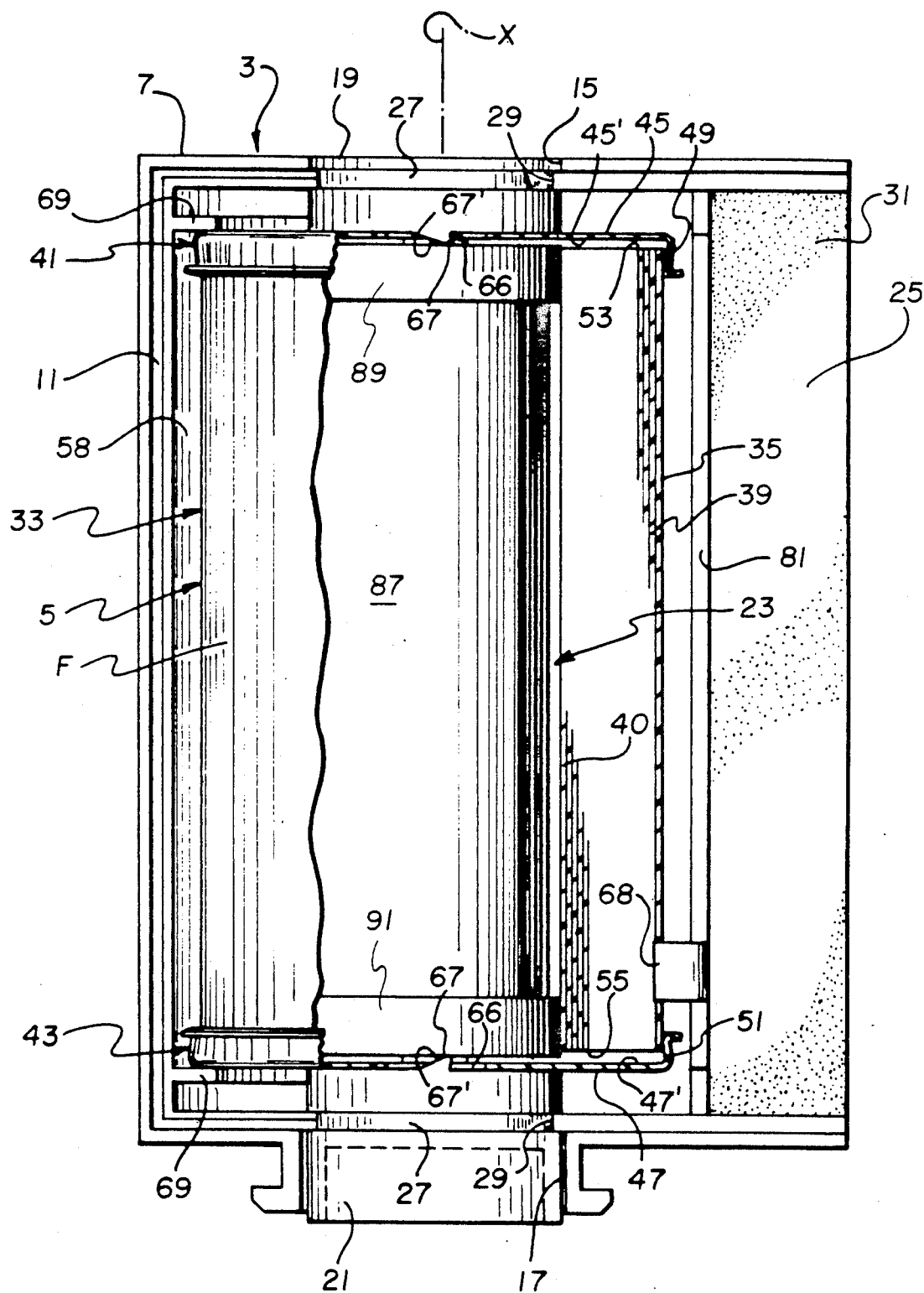
FIG. 13 is an elevation view partly in section of the film roll and the film spool, illustrating the manner in which one of a pair of film confining flanges of the spool may be fixed to the spool for concurrent rotation with the spool.

A roll 33 of 35 mm filmstrip F is coiled about the spool core 23 to form successive film convolutions. As shown in FIG. 3, the film roll 33 includes an outermost convolution which comprises a film leader 35 having a leading or forward end 37, and it includes a next-inward convolution 39 coiled behind the outermost convolution. The inner or trailing end 42 of an innermost convolution 40 of the film roll 33 is secured to the spool core 23 using known attachment means such as adhesive tape, not shown. See FIGS. 13 and 14.

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. See FIG. 12. Respective circumferential recesses 57 are provided in the spool core 23 for supporting the flanges 41 and 43 at their disks 45 and 47 to permit the flanges to be independently rotated about the axis X. The two recesses 57 are sufficiently spaced from one another along the spool core 23 to maintain respective inner faces 45' and 47' of the disks 45 and 47 slightly spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward edge 63 inclined from the longitudinal edge 53 of the film leader (outermost convolution) 35 to the other longitudinal edge 55 of the leader to form a forward-most tip or tab 65 of the leader which, like the edge-section 61, overlaps the annular lip 51 radially outwardly. See FIGS. 1, 2, 8 and 9.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the short and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12 and 13. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

Figure 4:
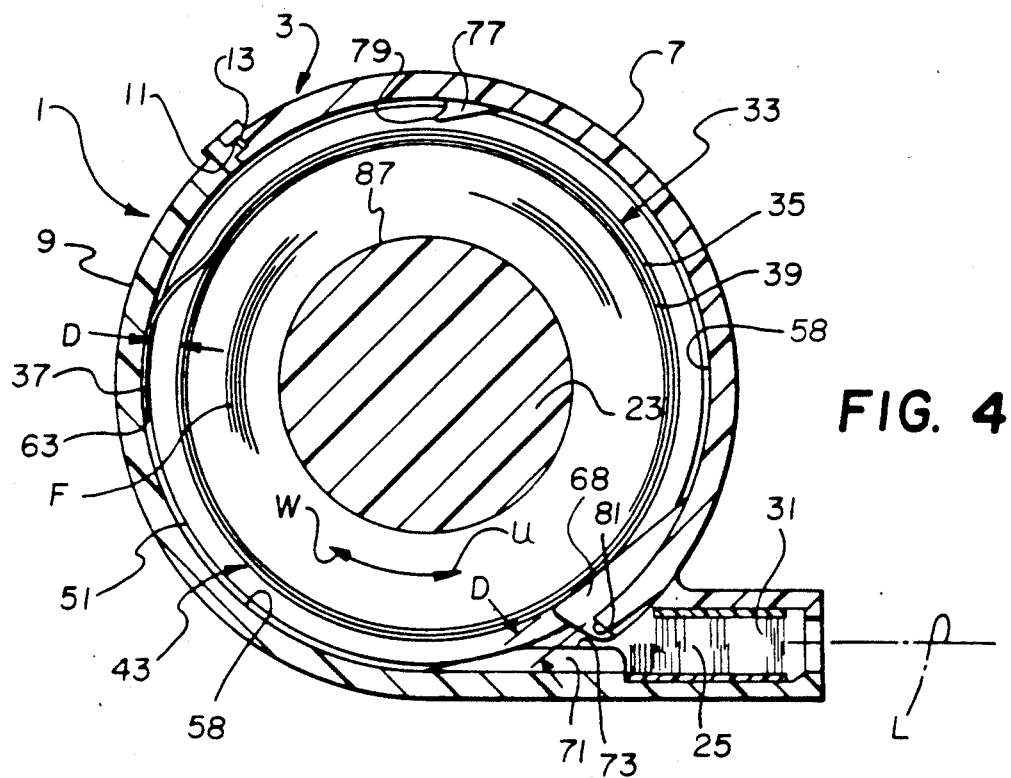
FIGS. 4, 5, 6 and 7 are end views similar to FIG. 3, illustrating the manner in which the film roll is unwound from the film spool.

A film stripper-guide 68 projecting from the interior wall 58 of the cassette half 7 is positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the spool core 23 in the unwinding direction U. See FIGS. 1 and 4–7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

Figure 10:
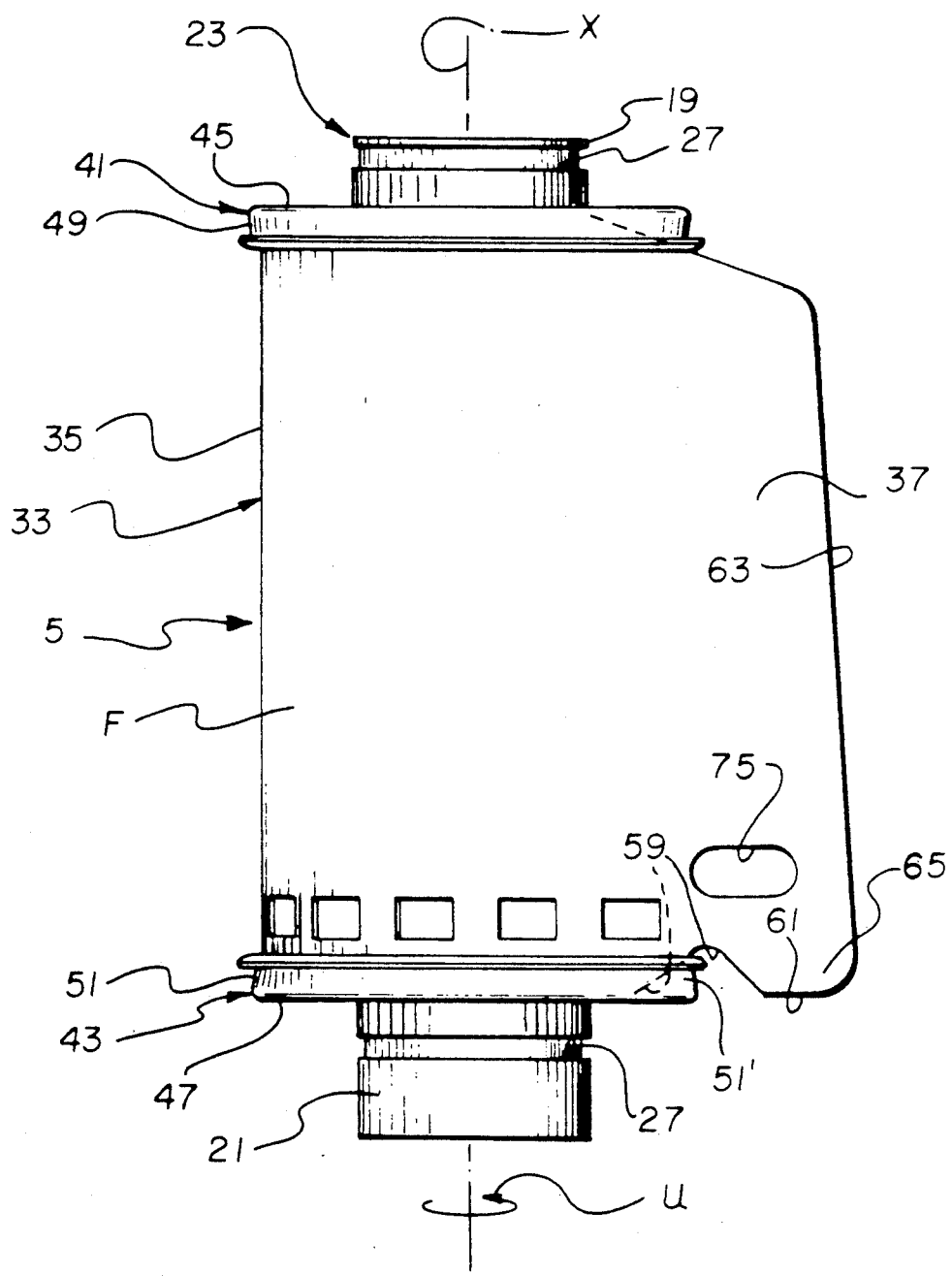
FIGS. 10 and 11 are elevation views similar to FIGS. 8 and 9, illustrating the manner in which the film roll is unwound from the film spool.

When the leading end 37 of the film leader (outermost convolution) 35 is advanced over the stripper-guide 68 responsive to rotation of the spool core 23 in the unwinding direction U, the longitudinal edges 53 and 55 of the leader start to gently flex respective arcuate portions of the two flanges 41 and 43 axially away from one another, first to allow the notch 59 to separate from the lip section 51', and then to allow successive longitudinal sections of the leader to exit from between the flanges to the outside of the cassette shell 3. See FIGS. 10 and 11.

The local flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be locally flexed. A pair of flat curved bearing members 69 extend from the interior wall 58 of the cassette shell 3 to lie flatly against successive arcuate portions of the two disks 45 and 47 as the flanges 41 and 43 are locally flexed axially away from one another, to thereby assure return of the flexed portions of the flanges to their normal original non-flexed condition. See FIGS. 1 and 2.

A film flattening member 71 projects from the interior wall 58 of the cassette half 9 in the vicinity of the inner entrance to the film passageway 25 and the stripper-guide 68 to support successive longitudinal sections of the film leader 35, beginning with its leading end 37, substantially flat as those sections are freed from the flanges 41 and 43, to facilitate movement of the leading end into the passageway. See FIGS. 6 and 7. The light-trapping plush 31 within the film passageway 25 is elevated along the passageway slightly beyond a longitudinal center line L of the passageway. The film flattening member 71 as shown in FIG. 3 projects almost to the center line L in order to support successive sections of the film leader 35 substantially flat at the center line. See FIGS. 6 and 7. Preferably, a substantially planar film-supporting face 73 of the flattening member 71 is spaced 0.005"–0.030" short of the center line L, and extends widthwise of the film passageway 25 as shown in FIG. 1.

Optionally, a slot 75 is cut in the film leader (outermost convolution) 35 substantially proximate its leading end 37. A tooth 77 fixed to the interior wall 58 of the cassette half 7 has a free pointed end 79 which is positioned to be received in the slot 75 to thus engage the film leader (outermost convolution) 35, when the film spool 5 is rotated in the winding direction W as shown in FIG. 3, and to exit the slot to thus disengage the leader, when the film spool is rotated in the unwinding direction U as shown in FIG. 4. The engagement of the film leader (outermost convolution) 35 and the tooth 77 responsive to rotation of the film spool 5 in the winding direction W prevents the leading end 37 of the leader from coming to rest between the stripper-guide 67 and the next-inward convolution 39.

Figure 6:
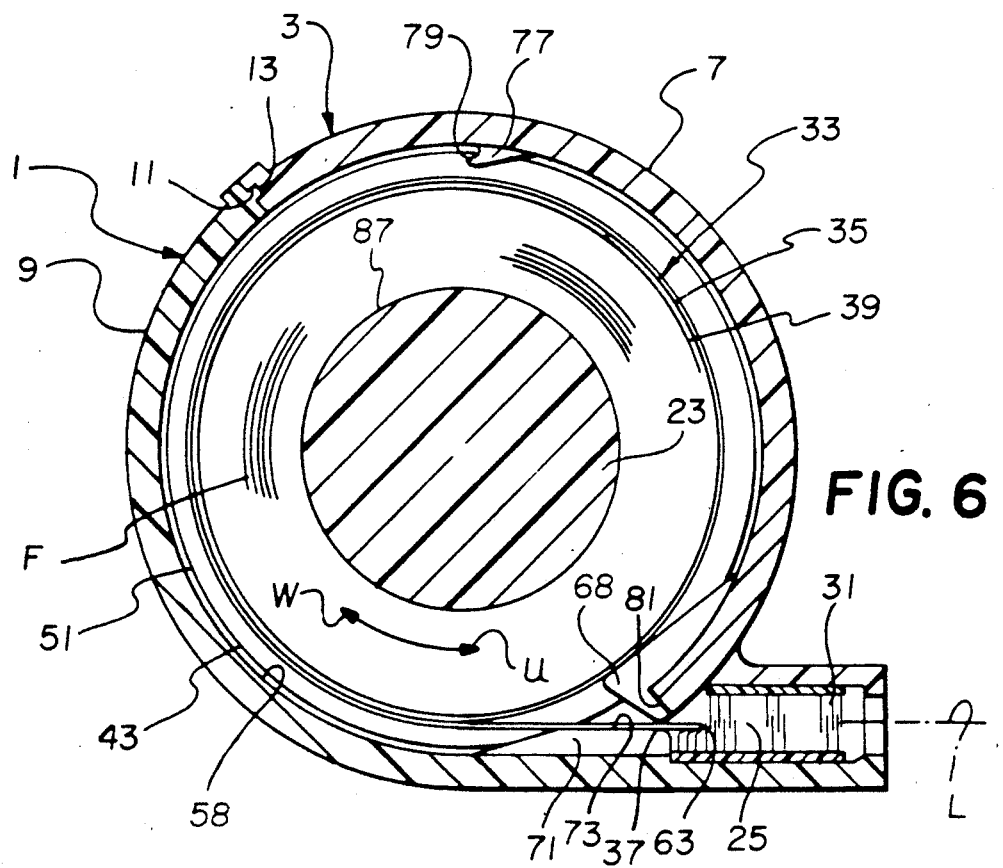
Figure 7:
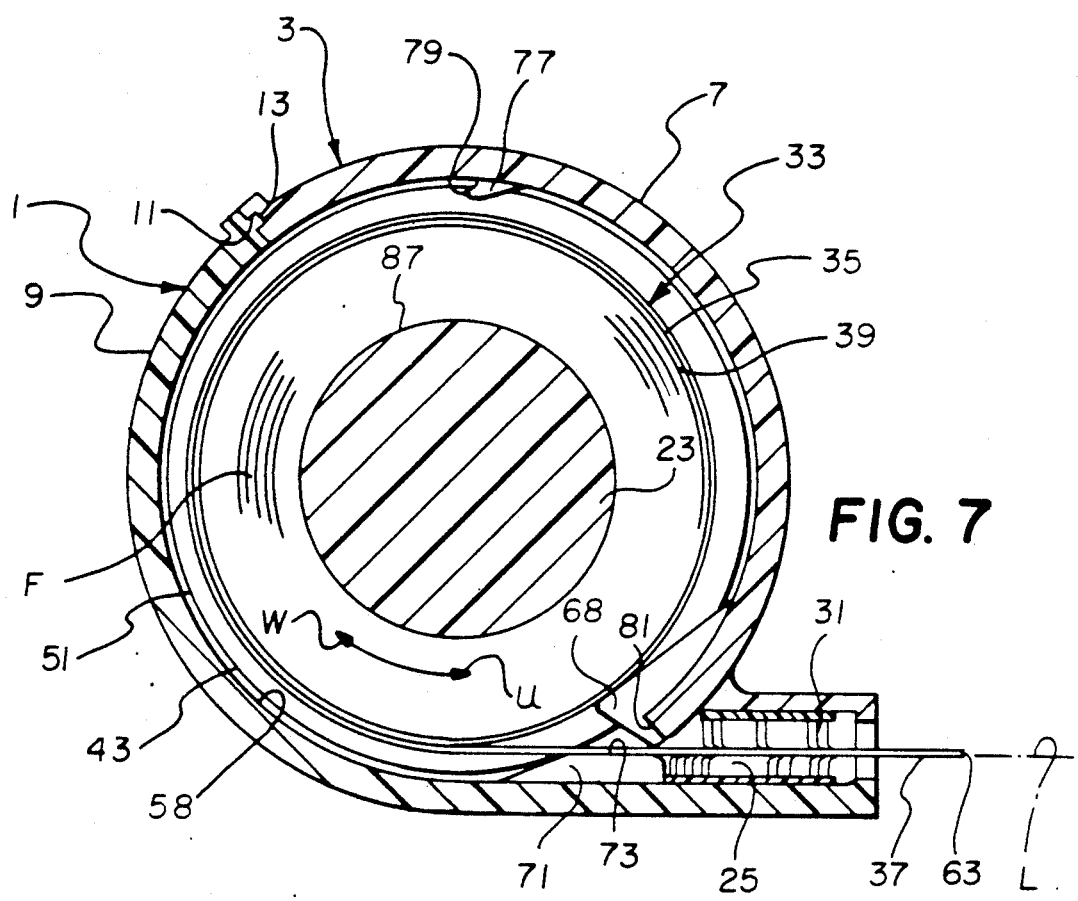
Figure 11:
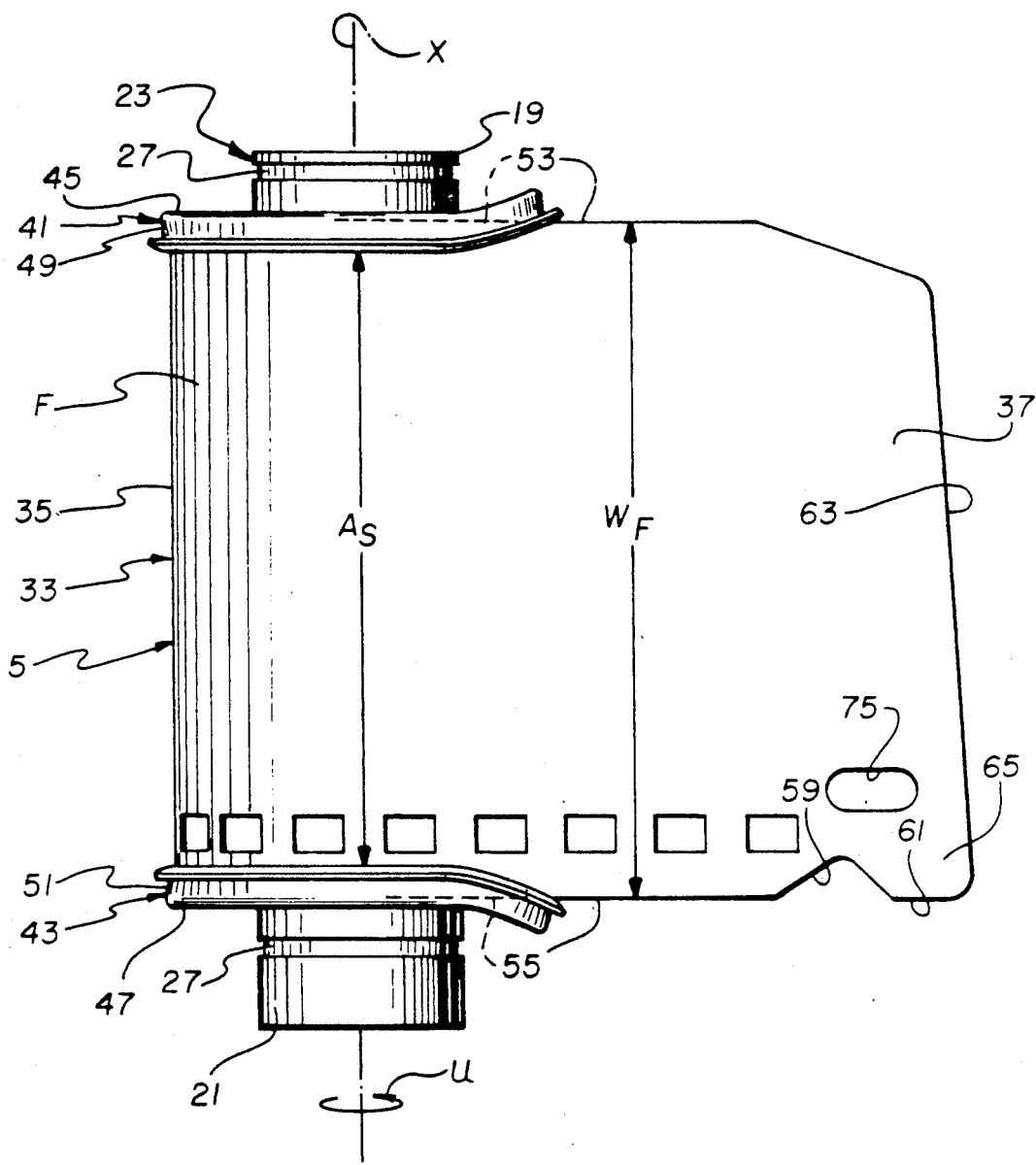

When the spool core 23 is initially rotated in the film unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51 as in commonly assigned U.S. Pat. No. 4,834,406 and U.S. Pat. No. 4,848,693, the hook-like members 67 will have moved along the respective slots 66 into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the stripper-guide 68, causing successive arcuate portions of the flanges 41 and 43 to be flexed axially away from one another as shown in FIG. 11. This first allows the notch 59 to separate from the lip section 51', and then it allows successive longitudinal sections of the film leader 35 to exit from between the flanges to the outside of the cassette shell 3. Since the stripper-guide 68 initially picks up the leading end 37 of the film leader 35 close to its forward-most tip 65, the forward edge 63 of the leading end might initially be supported along a narrow ridge 81 forming one end of the interior wall 58 of the cassette half 7. However, the leading end 37 will tend to back away from the ridge 81 and move against the film-supporting face 73 of the flattening member 71 as shown in FIG. 6.

If the spool core 23 is rotated in the film winding direction W after some length of the filmstrip F has been advanced from the cassette shell 3, the spool core is free to rotate relative to the two flanges 41 and 43 because the hook-like members 67 can move along the respective slots 66 out of engagement with the flanges. This permits the flanges 41 and 43 to be independently rotated in the winding direction W, though at a slower speed than the spool core 23 is rotated in that direction. Each of the hook-like members 67 may back out of one of the slots 66 and into the next slot during continued rotation of the spool core 23 in the winding direction W. At the same time, the filmstrip F will be rewound onto the spool core 23 between the flanges 41 and 43. The spool core 23 is rotated in the winding direction W substantially until the slot 75 in the film leader (outermost convolution) 35 receives the free end 79 of the tooth 77 to thus engage the film leader to the tooth.

Figure 14:
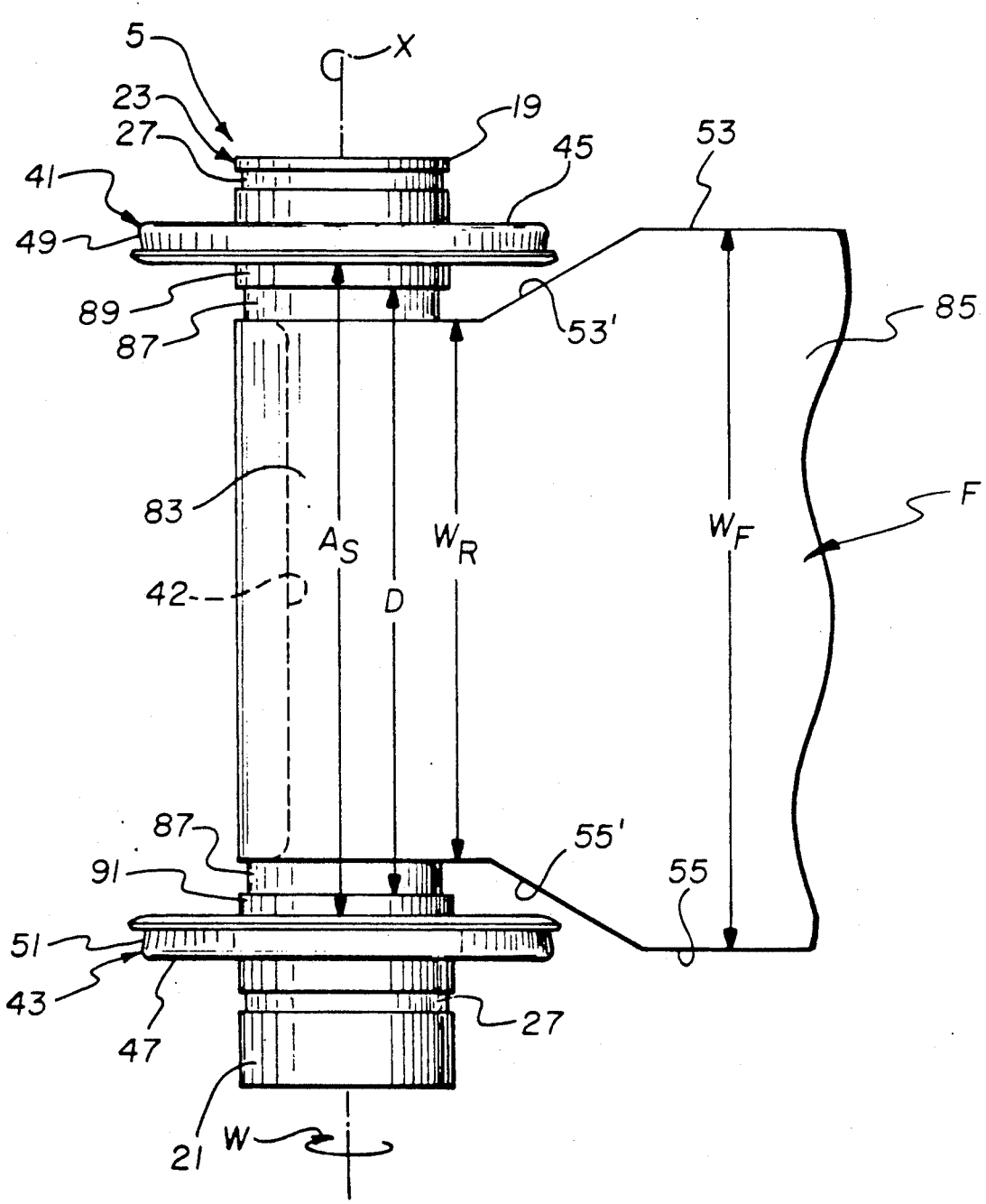

Turning now to FIG. 14, it can be seen that the filmstrip F has a relatively short longitudinal section 83 located between its trailing end 42, i.e. the one end attached to the spool core 23, and the remaining longitudinal section 85 of the filmstrip, which is sufficiently reduced in width to extend between the two flanges 41 and 43 without having to flex the flanges axially away from one another. The reduced-width film section 83 has a width $W_R$ that is less than the axial spacing $A_S$ between the annular lips 49 and 51 of the flanges 41 and 43. The axial spacing $A_S$, in turn, is less than the width $W_F$ of the remaining film section 85. The filmstrip F is tapered along its longitudinal edges 53 and 55 at 53' and 55', respectively, which is the junction of the reduced-width film section 83 and the remaining film section 85.

The spool core 23 includes a peripherally relieved portion 87 having an axial dimension D in FIG. 14 that is greater than the width $W_R$ of the reduced-width film section 83 and is less than the width $W_F$ of the remaining film section 85. Respective peripherally stepped portions 89 and 91 of the spool core 23 are located at opposite ends of the relieved portion 87 of the spool core 23. Thus, the stepped portions 89 and 91 of the spool core 23 are spaced apart the axial dimension D.

Figure 15:
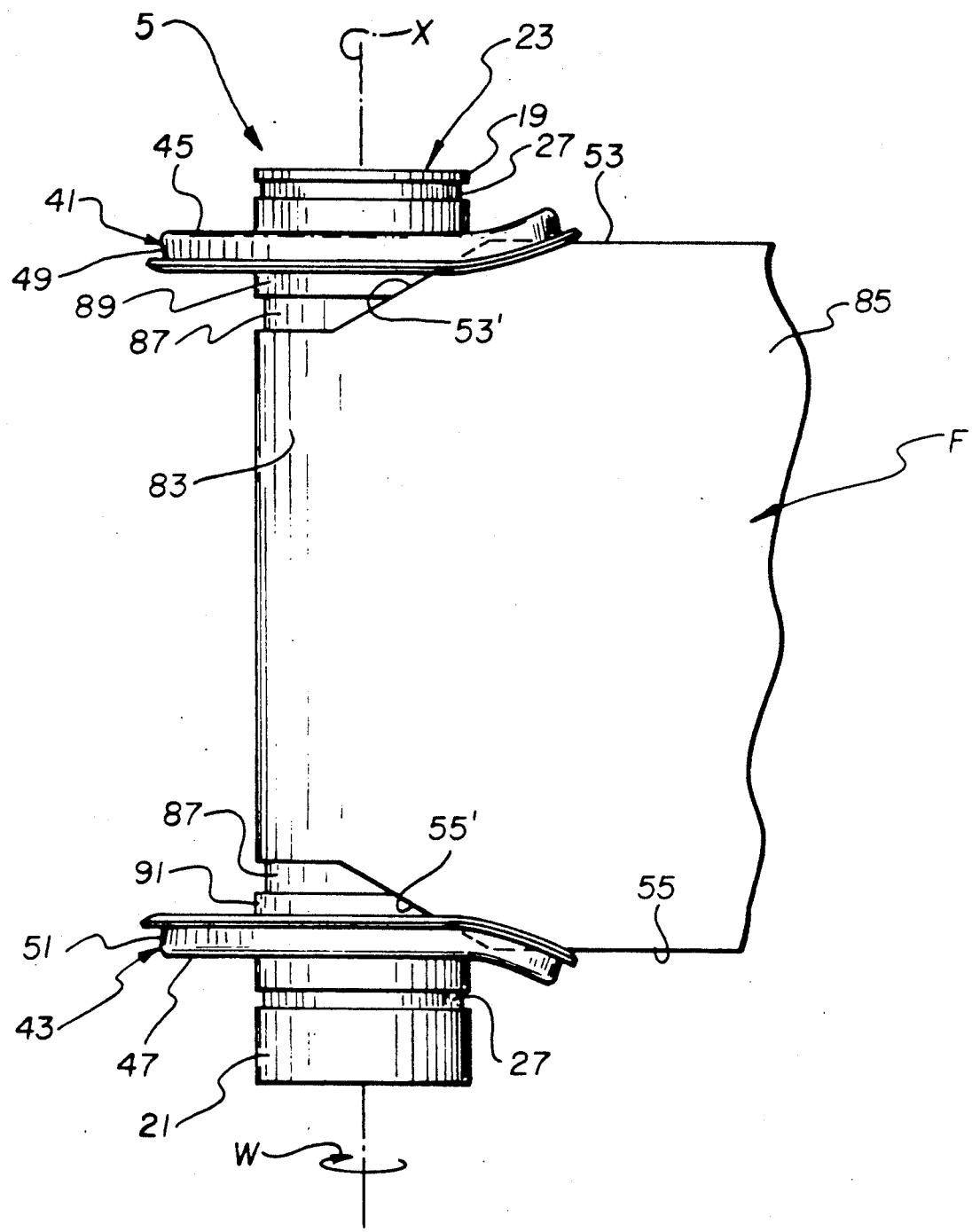

When it is desired to assemble the film cassette 1, the film spool 5 with the filmstrip F extended as shown in FIG. 14 is placed in the cassette shell 3. Since the filmstrip F is not wound onto the spool core 23 at this time, the film spool 5 can be placed in the cassette shell 3 with the two flanges 41 and 43 in a normal-relaxed condition, rather than a flexed condition. This makes it easier to properly position the film spool 5 within the cassette shell 3. Then, once the film spool 5 is positioned in the cassette shell 3, the spool core 23 can be rotated in the winding direction W to wind the remaining film section 85 from outside the shell onto the spool core. The tapered film edges 53' and 55' serve as a spreading means for gradually flexing the flanges 41 and 43 axially away from one another. See FIG. 15. The reduced-width film section 83 is wound onto the relieved portion 87 of the spool core 23, and the remaining film section 85 is wound onto the two stepped portions 89 and 91 of the spool core. See FIG. 15. It is believed that the gradual flexing of the flanges 41 and 43 at the tapered film edges 53' and 55' helps reduce any risk of the remaining film section 85 being wrapped over the outside of the annular lips 49 and 51 of the flanges when the remainding film section is moved to the annular lips as in FIG. 15.

The invention has been described with reference to a preferred embodiment. However, it will be appreciated that variations and modifications can be effected within the ordinary skill in the art without departing from the scope of the invention. For example, the film leader 35 could have respective edge portions as in cross-referenced application Ser. No. 07/490,232 for flexing the two flanges 41 and 43 apart in succession, rather than simultaneously, when the spool core 23 is rotated in the unwinding direction U.

I claim:

1. A film cassette comprising (a) a spool core supported in a cassette shell for rotation in film winding and film unwinding directions, (b) a filmstrip having opposite ends one of which is attached to said spool core to permit the spool core to wind said filmstrip from outside said shell onto winding direction, and (c) a pair of flanges arranged in coaxial spaced relation along said spool core, including respective skirted peripheries for overlying opposite longitudinal edges of said filmstrip to radially confine the filmstrip about the spool core, and adapted to be flexed farther apart at said skirted peripheries to permit the filmstrip to readily enter the confinement of said flanges for storage within said shell when the spool core is rotated in the winding direction and to readily escape the confinement of the flanges to exit the shell when the spool core is rotated in the unwinding direction, is characterized in that:

said flanges are sufficiently flexible relative to said filmstrip to permit the filmstrip at its longitudinal edges normally to flex the flanges farther apart at the skirted peripheries when the filmstrip enters or escapes the confinement of the flanges; and said filmstrip has a relatively short longitudinal section proximate said end of the filmstrip attached to said spool core which is sufficiently reduced in width to be moved inwardly of said skirted peripheries of the flanges without having to flex said flanges farther apart when the spool core is rotated in the winding direction to wind the filmstrip from outside said cassette shell onto the spool core.

2. A film cassette as recited in claim 1, wherein said filmstrip is tapered along its longitudinal edges at the junction of said short reduced-width longitudinal section of the filmstrip and a substantially remaining full-width longitudinal section of the filmstrip to serve as a spreading means for flexing said flanges farther apart at their peripheries when the filmstrip is wound from outside said cassette shell onto said spool core.

3. A film cassette as recited in claim 2, wherein said spool core includes a peripherally relieved portion having a coaxially measured dimension that is greater than the width of said short reduced-width longitudinal section of the filmstrip but is less than the width of said remaining full-width longitudinal section of the filmstrip for receiving only the short reduced-width longitudinal section when said filmstrip is wound from outside said cassette shell onto the spool core.

4. A film cassette as recited in claim 3, wherein said spool core includes respective peripherally stepped portions coaxially spaced for supporting said remaining full-width longitudinal section of the filmstrip proximate its longitudinal edges when said filmstrip is wound from outside said cassette shell onto the spool core.

5. A film cassette as recited in claim 2, wherein said peripheries of the flanges are normally spaced from each other a distance that is greater than the width of said short reduced-width longitudinal section of the filmstrip and is less than the width of said remaining full-width longitudinal section of the filmstrip.

6. A film cassette comprising (a) a spool core supported for rotation in film winding and film unwinding directions, (b) a filmstrip having opposite ends one of which is attached to said spool core to permit the spool core to wind said filmstrip onto the spool core when the spool core is rotated in the winding direction, and (c) a pair of flanges arranged in coaxial spaced relation along said spool core, including respective skirted peripheries for overlying opposite longitudinal edges of said filmstrip to radially confine the filmstrip about the spool core, and adapted to be flexed farther apart at said skirted peripheries to permit the filmstrip to readily enter the confinement of said flanges when the spool core is rotated in the winding direction and to readily escape the confinement of the flanges when the spool core is rotated in the unwinding direction, is characterized in that:

said flanges are sufficiently flexible relative to said filmstrip to permit the filmstrip at its longitudinal edges normally to flex the flanges farther apart at their skirted peripheries when the filmstrip enters or escapes the confinement of the flanges; and said filmstrip is tapered along its longitudinal edges generally towards said end of the filmstrip attached to said spool core proximate said end to serve as an initial spreading means for flexing said flanges gradually apart at their skirted peripheries when the spool core is rotated in the winding direction, to prevent the filmstrip from being wrapped over said skirted peripheries.

* * * * *